United States Patent [19]
Suzuki

[11] 3,945,034
[45] Mar. 16, 1976

[54] OPTICAL SYSTEM FOR A COLOR TELEVISION CAMERA

[75] Inventor: Michiko Suzuki, Tokyo, Japan

[73] Assignee: Canon Kabushiki Kaisha, Tokyo, Japan

[22] Filed: Apr. 30, 1975

[21] Appl. No.: 573,587

Related U.S. Application Data

[63] Continuation-in-part of Ser. No. 463,244, April 23, 1974, abandoned.

[30] Foreign Application Priority Data

Apr. 26, 1973 Japan.............................. 48-46701

[52] U.S. Cl...................................... 358/50; 358/55
[51] Int. Cl.²............................................ H04N 9/09
[58] Field of Search......... 358/55, 50; 350/171, 173

[56] References Cited
UNITED STATES PATENTS

| | | |
|---|---|---|
| 2,053,224 | 9/1936 | Reason .......................... 350/171 X |
| 2,971,051 | 2/1961 | Back .................................... 358/55 |
| 3,293,357 | 12/1966 | Doi et al.............................. 358/55 |
| 3,547,521 | 12/1970 | Ichizuka et al. .................. 358/55 X |

OTHER PUBLICATIONS

Cox, Arthur *A System of Optical Design*, 1964, p. 428.

*Primary Examiner*—Robert L. Griffin
*Assistant Examiner*—Mitchell Saffian
*Attorney, Agent, or Firm*—William R. Woodward

[57] ABSTRACT

An optical system for a color television camera device, wherein a first color-selecting filter is located in a substantially afocal light beam between the front group and the rear group of the relay portion; a first color component light separated by a first color-separating filter forms a first color component image on a first pickup tube with the aid of the first rear group of the relay portion; the light containing the remainder of the color components separated by the first color separating filter is directed to the second rear group of the relay portion; the light from the second rear group containing the abovementioned remainder of the color components is directed to a second color-separating filter; the lights containing second and third color components separated by the second color-separating filter are respectively directed to second and third pickup tubes; and these second and third lights form second and third color component images on second and third pickup tubes with aid of the second rear group of the relay portion.

1 Claim, 3 Drawing Figures

OPTICAL SYSTEM FOR A COLOR TELEVISION CAMERA

REFERENCE TO A RELATED APPLICATION

This application is a continuation-in-part of my earlier filed application Ser. No. 463,244 filed Apr. 23, 1974, and now abandoned, for "COLOR TELEVISION CAMERA DEVICE".

BACKGROUND OF THE INVENTION

1. Field of the Invention

This invention relates to an optical system for a color television camera device which has a first light-separating filter disposed in a substantially afocal light beam between the front group and the rear group of the relay portion.

2. Description of Prior Arts

According to the prior arts known to the applicant, the conventional color television camera device has a color-resolving filter disposed behind an objective lens.

For example, British Patent specification No. 1,207,282 published Sept. 30, 1970 discloses a color television camera device, in which the image of an object to be photographed is formed on a field lens through an objective lens, a front group of a relay lens is disposed in the light beam from this field lens, a tricolor-resolving optical system is further disposed in the light beam from the front group of the relay lens, and the rear group of the relay lens disposed in the light beams from the color-resolving optical system, whereby color-resolved images are obtained.

Such device, however, has been disadvantageous in that it tends to elongate distance between the objective lens and the pickup tubes, because the object image is once formed on the field lens.

U.S. Pat. No. 2,971,051 issued Feb. 7, 1961 and U.S. Pat. No. 3,202,039 issued Aug. 24, 1965 disclose color television cameras which use an objective zoom lens of long back-focus and a color-resolving optical system disposed in the back-focus portion of the zoom lens. In these devices, pickup tubes must be arranged radially with the consequent increase in height of the camera device.

On the other hand, the device shown in U.S. Pat. No. 2,971,051 has been successful in reducing its height by using a reflection mirror to arrange the pickup tubes in parallel each other, although such arrangement inevitably necessitates the back-focus of the zoom lens to be further lengthened, thus making it very difficult to design the lens.

Also, U.S. Pat. No. 3,547,521 issued Dec. 15, 1970 discloses an arrangement, wherein a color-resolving filter is interposed between the zooming section and the relaying section of a zoom lens. By adoption of such arrangement, the entire optical system becomes compact.

SUMMARY OF THE INVENTION

The optical system according to the present invention is similar to the optical system of this U.S. Pat. No. 3,547,521. However, in the optical system of the present invention, the color-resolving filter is interposed between the front and rear groups of the relaying section of the zoom lens. That is to say, in the optical system taught in U.S. Pat. No. 3,547,521, as the color-resolving filter is interposed between the zooming section and the relaying section of the zoom lens, a space interval should inevitably be provided between the zooming section and the relaying section thereof. Contrary to this, the optical system of the present invention uses a zoom lens having a space interval between the group of front lenses and the group of the rear lenses of the relaying section essentially sufficient to permit the color-resolving filter to be inserted thereinto. Such type of the zoom lens takes a negative Petzval's sum, particularly, at the magnification changing portion thereof. In order therefore to bring this Petzval's sum to a positive value, the relaying section is divided into two of the front group and the rear group, both having positive refractive power.

It is therefore an object of the present invention to provide a compact optical system for a color television camera.

Such object may be achieved by disposing a color-resolving optical system within the objective zoom lens of the television camera.

The foregoing object and other objects as well as the actual construction, and function of the optical system according to the present invention will become more apparent from the following detailed description thereof taken in conjunction with the accompanying drawing.

DESCRIPTION OF THE PREFERRED EMBODIMENTS

Figure 1:
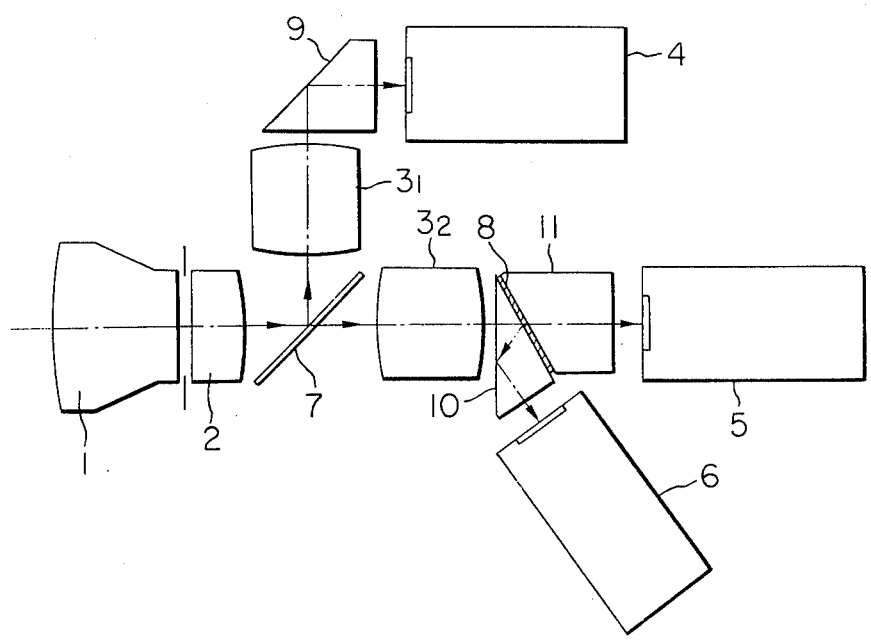
FIG. 1 is a schematic arrangement of the optical system for color television camera device according to the present invention.
Figure 2:
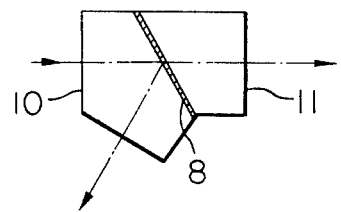
FIG. 2 shows another form of the color-resolving optical system useful for the device shown in FIG. 1.

Referring to FIG. 1, which shows a first embodiment of the present invention, a zoom lens comprises a zooming section 1 having a negative Petzval's sum, a front group 2 of a relaying section of the zoom lens having a positive refractive power, and first and second rear groups $3_1$ and $3_2$ of the relaying section having a positive refractive power. The zooming section includes at least a group of focussing lenses, a group of variator lenses, and a group of compensator lenses. Pickup tubes 4, 5, and 6 are provided to form thereon light component images of an object to be photographed. Designated by reference numeral 7 is a first color-resolving filter formed of a dichroic layer, etc. This filter may be held by and between prism blocks. One of color component lights separated by this first color-resolving filter 7 is directed to the first rear group $3_1$ of the relay lens so as to form a color component image on the pickup tube 4. The light which contains remainder of the color components from the first color resolving filter 7 is directed to the second rear group $3_2$ of the relay lens. The light from the second group of the relay lens is further directed to a second color-resolving filter 8. Color component lights separated by the second color-resolving filter are directed to the pickup tubes 5 and 6, respectively. A prism 9 is provided to enable the pickup tube 4 to be arranged in parallel with the pickup tube 5. In the embodiment shown, the second color-resolving filter 8 is held by and between two prism blocks 10 and 11, but these prism blocks may be omitted. Further, the prism 10 may be such that the light is reflected by the front face thereof to be directed to the pickup tube 6, or that, as shown in FIG. 2, the light is directed to the pickup tube 6 without being reflected.

Figure 3:
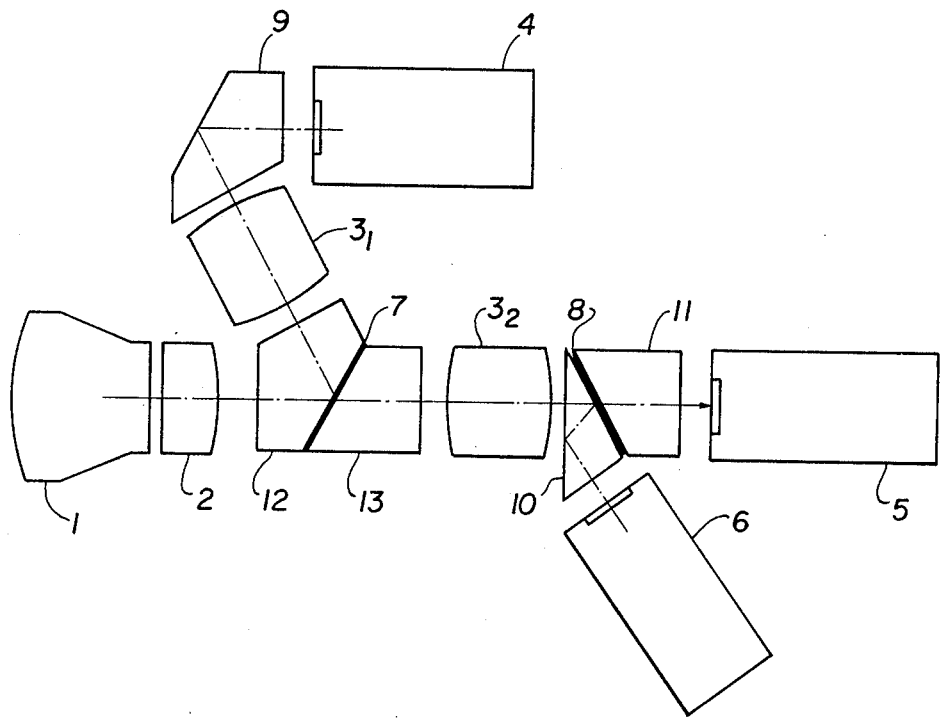
FIG. 3 is another schematic arrangement for explaining a second embodiment according to the present invention.

Another embodiment shown in FIG. 3 is in such a construction that the overall size of the device is made compact as well as the effect to be caused by color shading is reduced. In this embodiment, the first color-resolving filter 7 is held between the prism blocks 12 and 13. This filter 7 intersects with the optical axis at an angle of from 50° to 60°. In the drawing, it is shown to intersect with the optical axis at an angle of 52°. Similarly, a second filter 8 intersects with the optical axis at an angle of from 50° to 60°. Same as in the filter 7, it is also shown in the drawing to intersect with the optical axis at 52°.

By thus taking a large intersecting angle of the filters 7 and 8 with respect to the optical axis, the effect of the color shading can be reduced.

The arrangement of the present invention, as will be understood from the foregoing description, contributes to reduction in size of the television camera device.

Although the present invention has been described with particular reference to preferred embodiments as shown in the accompanying drawing, it should be noted that these embodiments are merely illustrative and not restrictive, and that any change and modification may be made within the purview of the present invention as set forth in the appended claim.

I claim:

1. An optical system for color television camera which comprises in combination:
   a. an objective zoom lens composed of a zooming section and a relaying section, wherein said zooming section has a negative Petzval's sum, and said relaying section has a positve Petzval's sum, and includes a front group of a positive refractive power and a first rear group of a positive refractive power, reflectively manner and the other light component light in a transmitting manner, said transmittingly separated light being directed to said first rear group;
   b. a second rear group of a positive refractive power, to which said reflexively separated light component by said first color resolving filter is directed, a monochromatic image being formed on a pick-up tube by said second rear group; and
   c. a second light resolving filter disposed after said first rear group of said relaying section, and which resolves further the light transmitted through said first light resolving filter into two light component lights, each of said further resolved light component lights forming a monochromatic image on each of second and third pick-up tubes.

* * * * *